United States Patent [19]

Isaacson et al.

[11] 3,849,330

[45] Nov. 19, 1974

[54] CONTINUOUS PROCESS FOR IMMOBILIZING RADIONUCLIDES, INCLUDING CESIUM AND RUTHENIUM FISSION PRODUCTS

[75] Inventors: Raymond E. Isaacson; Lloyd E. Brownell, both of Richland, Wash.

[73] Assignee: The United States of America as represented by the United States Atomic Energy Commission, Washington, D.C.

[22] Filed: Nov. 22, 1972

[21] Appl. No.: 308,917

[52] U.S. Cl... 252/301.1 W, 252/301.1 R, 423/111, 423/249, 423/328
[51] Int. Cl............................................ G21c 19/42
[58] Field of Search ............ 252/301.1 R, 301.1 W; 423/249, 328, 111

[56] References Cited
UNITED STATES PATENTS

| | | | |
|---|---|---|---|
| 3,110,557 | 11/1963 | Spector | 252/301.1 W |
| 3,303,140 | 2/1967 | Heinemann | 252/301.1 W |
| 3,340,202 | 9/1967 | Olombel et al. | 252/301.1 R |
| 3,451,940 | 6/1969 | Stukenbroeker et al. | 252/301.1 W |

Primary Examiner—Benjamin R. Padgett
Assistant Examiner—R. E. Schafer
Attorney, Agent, or Firm—John A. Horan; Robert M. Poteat

[57] ABSTRACT

A continuous process for immobilizing radionuclides, including cesium and ruthenium fission products as a complex metalo-silicate product which is virtually insoluble and non-leachable in alkaline or neutral environments comprises continuously passing a premix consisting of a source of oxygen, and inert material, a fuel, said fuel having a concentration based on weight of reaction material which is subcritical to continuous ignition reaction, and the radionuclide as a nitrate salt or calcined oxide, into a reactor and reacting by an exothermic thermite type reaction said premix with additional fuel whereby a complex metalo-silicate melt is formed, contacting condensate of off gases from said reaction with a mixture of sodium aluminate and sodium silicate or sodium hydroxide and clay materials (e.g., bentonite) at 90°C and atmospheric pressure to immobilize cesium sublimates as cesium aluminosilicate, recycling said cesium aluminosilicate to said reactor as part of said premix, removing noble metal fission products including ruthenium as reduced metal from said complex metalo-silicate melt, and charging said complex metalo-silicate melt into a container for storage.

5 Claims, 1 Drawing Figure

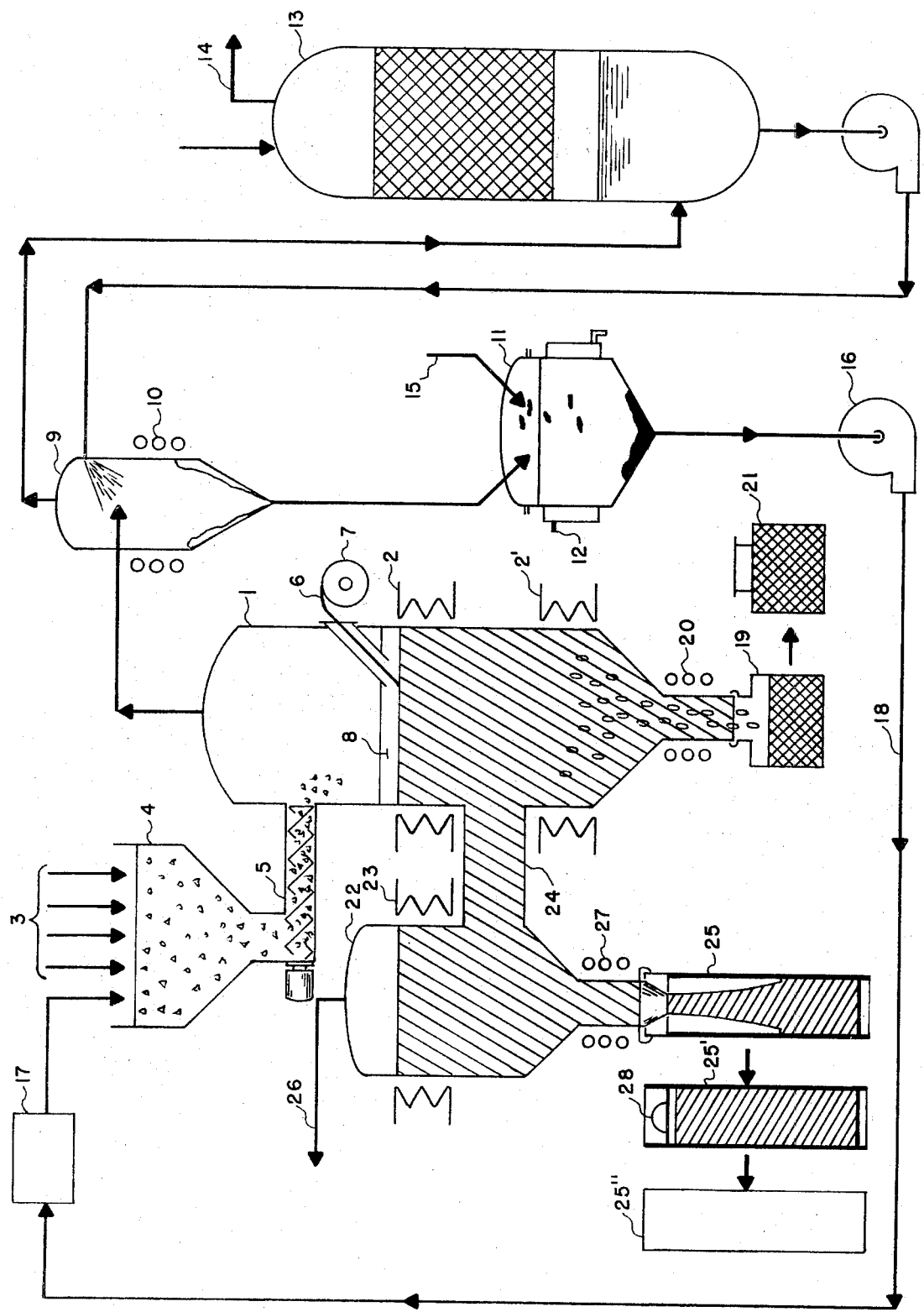

CONTINUOUS PROCESS FOR IMMOBILIZING RADIONUCLIDES, INCLUDING CESIUM AND RUTHENIUM FISSION PRODUCTS

BACKGROUND OF THE INVENTION

The invention described herein was made in the course of, or under, a contract with the U.S. Atomic Energy Commission.

The present invention relates to a method of immobilizing radionuclide wastes in a form which is virtually insoluble and non-leachable in alkaline or neutral environments and more particularly to a continuous process using a thermite type reaction for immobilizing radionuclides as stable, insoluble, complex metalo-silicates.

Methods for disposing of radionuclides in wastes, such as $^{90}Sr$, $^{95}Zr$, $^{95}Nb$, $^{99}Tc$, $^{137}Cs$, $^{144}Ce$, $^{147}Pm$, $^{238}Pu$, $^{239}Pu$, $^{241}Am$ and mixtures thereof, from nuclear reactors is of widespread interest and much concern. If the primary objective of the civilian power reactor program in the United States — that of achieving widespread commercial use of nuclear energy for the production of electricity with minimum impact on the environment — is to be achieved, suitable and satisfactory methods must be available for disposal of the radionuclide wastes from the reactors. Much research and development has been and continues to be spent in finding acceptable waste disposal methods. Many methods devised have advantages and disadvantages. Containerization is convenient and simple but because of the finite life of the containers it alone cannot be used as the ultimate storage of the radionuclides. Burial in salt mines or bedrock caverns have obvious drawbacks.

In our patent application Ser. No. 265,041 filed on June 21, 1972, for "Process for Encapsulating Radionuclides" there is discussed a waste disposal concept wherein radionuclides are immobilized as stable insoluble complex metalo-silicates which can be stored at the Hanford Reservation in deep basalt formations, a quite similar system, at essentially equilibrium with its surroundings. In that process each embodiment — gel, hydrothermal or kaolinite addition — provided for a mobile system whereby the metalo-silicate constituents reoriented into a condensed crystal lattice forming a cage structure with the condensed metalo-silicate lattice which completely surrounds the radionuclide and traps it therein.

In U.S. Pat. No. 3,451,940, issued June 24, 1969, in the names of George L. Stukenbroeker et al. for "Process for the Fixation of High Level Radioactive Wastes" there is described a waste disposal process wherein an exothermic thermite reaction (metal salt plus silicon) is employed to form by fusion at high temperature a polysilicate product having the radioactive fission products retained therein. Process waste solutions, typically nitrates, are converted to less volatile acid salts, e.g., sulfates, evaporated, admixed with silicon to form a thermite mixture and ignited to form the polysilicate product. In a companion paper (I&EC Process Design and Development, Vol. 7, No. 1, January 1968, pp. 117–121), the process is written up and there is noted that any volatile fission products, i.e., ruthenium and cesium, are trapped during denitration and ignition in a thermite mix "cap" at the top of the reactor (the ignition of the thermite mix proceeds downward through the mass). The process has both advantages and disadvantages as a mode of immobilization of radioactive waste products. First the patentee goes to a sulfate as a means of avoiding the generation of volatile off gases and sublimates, but this requires a conversion of aqueous nitrate solutions which are the most abundant form of nuclear waste solutions; and where all of the nitrates are converted to the sulfates as taught and claimed by the patentee, problems have been found with the thermite type reaction given (alum plus silica), the main one of which is not being able to ignite the thermite mass as described. Moreover, while the patentee teaches that the process is suitable for control of all radioactive species including potential volatiles, in a single final product, it has been found, contrary wise, that the cesium is not totally trapped in the thermite mix "cap" as discussed. In experiments to duplicate the trapping of cesium in a cap of mixed silicates it was found that about 2.7 wt percent cesium sublimates are driven off. Finally, the process rate of reaction and maximum temperature are quite difficult to control, since the process is controlled by the composition of the mixture.

SUMMARY OF THE INVENTION

Having these difficulties and disadvantages in mind, it is an object of this invention to provide an overall continuous process for immobilizing radionuclides, including cesium and ruthenium fission products, in a stable, virtually insoluble form by which the above-noted disadvantages are overcome.

Another object is to provide a continuous waste immobilization process utilizing a thermite type reaction wherein the process parameters are easily maintained.

The invention, accordingly, comprises an overall continuous process for immobilizing radionuclides, including cesium and ruthenium fission products as a complex metalo-silicate product comprising the steps of continuously passing a premix consisting of a source of oxygen, an inert material, a fuel, said fuel having a concentration based on weight of reaction material which is subcritical to continuous ignition reaction and the radionuclides as a nitrate salt or calcined oxide into a reactor, reacting by an exothermic thermite type reaction said premix with additional fuel whereby a complex metalo-silicate melt is formed, contacting condensate of said off gases from said reaction with a mixture of sodium aluminate and sodium silicate or sodium hydroxide and clay (e.g., bentonite) at about 90°C and atmospheric pressure to immobilize cesium sublimates as cesium aluminosilicate, recycling said cesium aluminosilicate to said reactor as a portion of said premix, removing ruthenium fission products as a reduced ruthenium metal from said complex metalo-silicate melt and charging said complex metalo-silicate into a container for storage.

Our overall continuous process affords an excellent process for immobilizing radionuclides in a stable non-leachable product wherein process parameters are more readily controlled and volatiles and sublimates, such as ruthenium and cesium, are incorporated in the stable non-leachable product. Advantageously, our process enables wide latitude in processing of radionuclides, such as with a solely melt technique with suitable furnace as previously employed in the art to a fully exothermic thermite type reaction or combinations between these limits.

BRIEF DESCRIPTION OF THE DRAWINGS

The sole drawing is a flow sheet exemplifying our overall continuous process whereby radionuclides, including cesium and ruthenium fission products, are immobilized in a stable, virtually non-leachable complex metalo-silicate.

DESCRIPTION OF THE PREFERRED EMBODIMENT

To facilitate an understanding of the invention, reference is made to the sole drawing.

Reactor 1 which is used to conduct the exothermic thermite type reaction may be of conventional design and construction. Induction heaters 2, 2' surround reactor 1 and are capable of heating the premix reaction mass to a temperature of at least 1,450°C without heat from the exothermic reaction. Premix 3, consisting of a source of oxygen, an inert material, a fuel having a subcritical concentration based on weight of reaction material and the radionuclides as a dry nitrate salt or calcined oxide is continuously fed from hopper 4 to reactor 1 by screw conveyor 5 or other suitable conveyor means for continuous feeding.

At this stage of describing the invention it is well to fix a few definitions of terms. By the terms "source of oxygen" it is intended herein to refer to a metal oxide or mixture of metal oxides such as iron oxide, manganese dioxide, or calcined waste, or a metal nitrate, nitrite, sulfate, sulfite, carbonate or mixture thereof as in salt cake waste. By the term "fuel" it is meant herein to refer to metals with high heat, or oxidation such as aluminum, silicon, magnesium, zirconium, titanium or alloys thereof but with aluminum and silicon preferred for the formation of aluminosilicate systems. The term "inert" refers to additions not contributing significantly to the generation of heat by exothermic reaction but important to modify the rate of reaction and to form desirable aluminosilicates or ferrosilicate systems. By the term "subcritical" it is meant herein a premix with a weight percent of fuel insufficient to maintain a continuing exothermic reaction. In the pilot plant run a supercritical premix containing 18.0 wt percent Si as fuel was used to produce a molten heel in the container by batch exothermic reaction as a starter for the continuous reaction. A subcritical premix containing only 15.0 wt percent Si was added at a rate of 1 lb. per 72 sec. and the reaction made critical by simultaneous small additions of aluminum and by control or rate of addition. The reaction continued at a controlled rate during addition of 100 lbs. of subcritical premix.

In a preferred embodiment the premix consists of 30 wt percent dry salt cake waste as a source of oxygen, 12 to 15 wt percent Si metal granules as fuel, 30 wt percent iron oxide ($Fe_2O_3$) as viscosity controller and supplemental source of oxygen, and 25 to 28 wt percent crushed basalt as inert controller and source of aluminosilicates. The silicon metal is oxidized from elemental silicon to silicon dioxide and the iron oxide partially reduced to fayalite, $Fe_2SiO_4$. The waste salt cake has a high sodium nitrate content and is reduced to the oxide form with release of oxides of nitrogen and the formation of a glass high in iron and sodium. The oxides of nitrogen are reduced further to lower oxides and nitrogen by elemental silicon and aluminum. Cesium and strontium nitrates are reduced to oxides and form cation aluminosilicates, such as pollucite and strontium feldspar. Some cesium may have escaped as sublimate with the gas before immobilization as pollucite is complete. Ruthenium oxide in the waste will be reduced to elemental ruthenium.

The preferred mode of operation is a continuous process combining the continuous exothermic reaction in the reactor 1 and a hydrothermal reaction described in Ser. No. 265,041, supra, in the reaction tank settler 11. The objective of combining hydrothermal reaction and the present continuous exothermic reaction is to obtain more complete immobilization of both cesium and ruthenium, the most mobile of the cations in the fission products. Cesium oxide in calcined waste is volatile at temperatures of a few hundred degrees Centigrade and a portion will tend to escape in a thermite type exothermic reaction as a sublimate before it can be trapped in the aluminosilicate cage of the silicate melt as pollucite. The sublimate may also contain oxides of sodium, potassium, silicon, and aluminum depending upon the premix formulation and temperature in the reaction zone. Although the thermite type exothermic reaction allows come cesium to volatize, the strong reducing conditions produced by the use of elemental silicon or aluminum as fuel prevents the volatilization of ruthenium as the tetroxide, $RuO_4$. Use of iron oxide in the premix results in the formation of a metal regulus containing iron and other cations more noble than iron such as ruthenium, rhodium, and palladium. Copper, silver, platinum, and gold would also appear in the regulus if they were present. Lead, nickel, and cobalt are also less active than iron and may be reduced to elemental form.

Because the premix has a subcritical concentration of fuel, the reaction in reactor 1 will continue only by charging the reactor with additional fuel or by supply of heat from heaters 2 and 2'. In our overall continuous process the additional fuel is readily provided by aluminum wire 6 which is provided on a reel 7 and is removed or inserted into the reaction zone 8 of reactor 1.

Control of the temperature in both the reaction zone and at the base of the reactor 1 is important to control sublimation, the temperature and fluidity of the silicate melt, and the separation of reduced metals. If the temperature is excessive in the reaction zone, sublimation above and beyond that of removal of free cesium oxide will occur and aluminosilicates, less stable than pollucite such as sodium aluminosilicate, will lose sodium oxide and silicon monoxide in the reducing zone of the reaction, increasing the quantity of sublimate without advantage. If the temperature in the reaction zone is low, the temperature and fluidity of the silicate melt below the reaction zone will tend to be low. Control of the rate of reaction and maximum temperature of the exothermic thermite type reaction is achieved:

1. By the type and weight percent of metal fuel in the premix.
2. By the type and weight percent of oxidizers in the premix.
3. By the weight percentage of inerts (basalt, Hanford sand, recycle) in the premix.
4. By the use of additional fuel during reaction such as aluminum wire so to provide rapid adjustment in fuel ratio.
5. By change in heat input from induction heaters.

6. By use of cooling coils (not shown).
7. By rate of feed when heat losses are fixed.

Off gas and sublimate collection from reactor 1 is provided by cyclone separator 9 which is outfitted with cooling coils 10. Sublimates which are principally cesium and sodium oxides plus some particulates are in turn passed as a slurry into reaction tank and settler 11 which is steam heated via line 12 and off gases from the cyclone separator 9 are scrubbed in scrubber 13 with water which is recycled to cyclone separator 9. The fine particulates in the off gas are removed and the residual gases, mainly nitrogen are emitted from scrubber 13 to stack via line 14.

In reaction tank and settler 11 the cesium as the hydroxide is reacted with a mixture 15 of sodium aluminate and sodium silicate or sodium hydroxide and clay (e.g., bentonite) at about 90°C and one atmosphere to form synthetic pollucite ($Cs_2O \cdot Al_2O_3 \cdot \eta SiO_4$) with "$\eta$" equal to 4, whereby the cesium is immobilized in the pollucite crystal lattice. For a more complete description of this immobilization process see our earlier filed patent application Ser. No. 265,041, supra.

Sublimation was considered to be undesirable in the early batch tests of the exothermic type reaction because it resulted in loss of some of the cesium to the sublimate. However, in our present process sublimation is considered desirable as it provides a means of separating volatile cesium not entrapped in the silicate melt. The hydrothermal reaction described in our patent application cited above in the form of the Gel or Clay process is indicated in the flowsheet with use at atmospheric pressure and 90°C to convert soluble and volatile cesium oxide to insoluble, nonvolatile pollucite. The pollucite appears as a fine microcrystalline product suspended as a slurry in the reaction tank and settler 11. Completion of the reaction to microcrystalline pollucite requires a few days at a temperature of 90°C. Two or more reaction tanks are required for continuous operation so that one may be undergoing reaction while the other is being filled. Transfer is performed by periodical flushing of the sublimate collected in the cyclone separator 9 with contaminated wash water from the scrubber 13. The pollucite product, together with other aluminosilicates such as feldspars and unreacted clay particles, is pumped as a slurry via pump 16 to a filter-dryer 17 via line 18 where it is separated from water and dried prior to passing into hopper 4 as part of the premix 3. The dry product is recycled to the premix hopper 4 and blended with the waste (calcine or salt cake) and thermite additions such as silicon granules, iron oxide, and crushed basalt.

As the reaction proceeds in reactor 1 molten metal which is more dense than the molten silicate is formed and falls downwardly through the silicate melt into container 19 which is affixed to the lower end of reactor 1. There the molten metal displaces the silicate melt filling container 19. The separation of the molten metal and silicate will be more complete if the temperature in the lower section of reactor 1 is kept above the melting point of the metal mixture. The presence of both silicon and carbon in the melt tends to reduce the melting point of the ferrous alloy. The carbonate content of saltcake waste introduces carbon to the melt. If calcined waste is used, some carbonate addition in the premix may be beneficial to reduce the melting point of the regulus.

The heat removed by sublimation plus heat losses from the walls or by cooling coils tends to reduce the temperature of the silicate melt below the reaction zone. This lowers the temperature and fluidity of both the silicate melt and the reduced metal phase. Based on the measured melting points, viscosity and observations with exothermic reactions, a temperature of 1,3000° to 1,400°C is considered desirable for a melt with a high ferrosilicate content. If the melt has a high aluminosilicate content, higher temperatures or the addition of borate may be required to provide a fluid melt. A maximum temperature is beneficial at the top of the metal separator 19 to expedite the separation of the silicate and reduced metal phases.

Cooling coils 20 surround a necked-down cylindrical section of reactor 1 just above container 19 and serve as a freeze valve to preclude the silicate melt from flowing from reactor 1 when container 19 is disconnected from reactor 1.

Advantageously, ruthenium fission products which are highly volatile and are not immobilized in the complex metalo-silicate as are the other radio nuclides, excepting of course cesium, will be reduced to ruthenium metal by either elemental silicon or elemental aluminum and be separated with the other metals, e.g., iron, rhodium, palladium, nickel, chromium, silicon via container 19. When container 19 is filled, the temperature of the silicate melt is lowered by cooling coils 20, freezing the silicate and container 19 consisting of a metal ingot 21 containing noble metals (Ru, Rd, Pd) is disconnected from reactor 1 and an empty container is attached in its place.

Adjacent reactor 1 is a filler tank 22 which is heated by induction heater 23 and communicates with reactor 1 via side discharge 24 which is also heated by induction heater 23. Filler tank 22 is at its lower end adapted to receive a suitable waste container 25, 25', 25" for filling of the complex metalo-silicate and has a vent pipe 26 for removing off gases to scrubber and stack (not shown). Cooling coils 27 serve as a transfer mode for preventing the silicate melt from flowing out of filler tank 22 when waste containers are changed. It will be appreciated here that there are widely different designs for containerization of liquid radionuclide wastes. One design which is preferred is a carbon steel container (8 to 12 inches in diameter) having a ceramic (mullite) liner. After container 25 is filled with silicate the top 28 is closed, such as by welding and is ready for removal to the long-term storage site. In long-term storage, metal container walls can be expected to fail. For example, if the containers are stored in a formation of rock salt, the metal wall can be expected to corrode away in a few months whether fabricated of stainless steel or carbon steel. The ceramic liner, however, is expected to resist corrosion and to provide a non-contaminated surface.

Batch tests with thermalt reactions have shown that premixes fueled with silicon metal and with iron oxide as a major source of oxygen produce silicate melts with low viscosity and low melting point as compared to aluminosilicate melts because of the low viscosity and low melting point of fayalite, $Fe_2SiO_4$. Previously borates have been employed to reduce viscosity and melting point. The use of fayalite glass in our process for this purpose is considered to be novel. At temperatures of 1,230°C or higher the viscosity of fayalite glass drops to less than 10 poise. This is considered to be lower than can be obtained with previous borosilicate formulations. Some aluminosilicate may be advantageous to provide the pollucite cage for cesium even though iron can also form a pollucite cage. The basis is that preliminary measurements and consideration of thermodynamics indicates that cesium aluminosilicate (pollucite) is more stable than cesium ferrosilicate, an analog of pollucite. If pollucite is formed in the presence of an excess of both aluminum and iron cations, a mixed metalosilicate with 91 percent alumino and 9 percent ferrosilicate resulted. This mixed form is considered to be the most stable form because of reduced lattice strain in the crystal structure.

The cylindrical containers described above provide a convenient way to handle high activity wastes. The small diameter of the container permits release of heat generated by high-activity waste and the cylindrical shape is easy to shield when shipping or transport is involved. Containers may be stored in a basalt cavern, or in an underground stack below an arid site or in a deep sea bed. For a more complete description of this see report ARH-2649, "The Silicified Waste System for Radionuclide Management," L. E. Brownell et al.

It should be emphasized here that even though containerization which will fail, is used to store out product, the radionuclide wastes are immobilized in a state virtually insoluble non-leachable, complex metalosilicate product which precludes the radionucludes from contaminating the surrounding environment for our product which has leach rates in the range of $1 \times 10^{-7} gm \cdot cm^{-2} \cdot day^{-1}$. These rates are 5 to 6 orders of magnitude lower than those for calcined wastes.

It will be apparent to those skilled in the art that our overall continuous process affords a convenient method for immobilizing radionuclides including cesium and ruthenium and by recovering ruthenium as a reduced metal and recycling cesium sublimates immobilized in the synthetic pollucite.

Example

To determine the feasibility of conducting a continuous thermite reaction a test was made of sustaining the reaction by feeding the reaction zone with a subcritical premix and making the reaction zone supercritical by addition of supplement fuel in the form of aluminum.

For this purpose a batch container with approximately 1 sq. ft. of cross-sectional area and about 3 ft. in depth was buried in sand and a 2 inch layer of quartz sand used in the bottom as an insulator. A starting heel of molten silicate was prepared as a 50 lb. supercritical batch. It contained 10.0 lbs. (20 wt%), $NaNO_3$, 3.3 lbs. (6.6 wt%) of $NaAlO_2$, 2.7 lbs. (5.4 wt%) of $Na_2CO_3$, and 2.7 lbs. (5.4 wt%) of $NaNO_2$ making a total of 15.3 lbs. (30.6 wt%) of simulated ITS waste. A charge of 9.0 lbs. (18 wt%) of Si granules were used as fuel. A charge of 7.7 lbs. (15.4 wt%) of $Fe_2O_3$ was used to control viscosity and melting point. A charge of 14.7 lbs. (29.4 wt%) of sandy soil was used to moderate the reaction.

To initiate reaction, this 50 lb. heel was ignited with a fuse using a thermite starting powder and reacted normally for 8 minutes. The subcritical premix consisted of 100 lb. batch containing 30.0 lbs. of $NaNO_3$, 15.0 lbs. of Si metal granules, 30.0 lbs. of $Fe_2O_3$ and 25.0 lbs. of sandy soil for control. The subcritical premix was field tested and would not support continuing reaction by itself but became supercritical with the addition of aluminum foil. This premix was divided into 100 lots and each was wrapped in aluminum foil before ignition of the starter heel. Some of the 100 balls had two aluminum foils for variation of aluminum feed rate.

The total reaction lasted 20 minutes including the 8 minutes for the batch starting heel. The reaction speed could be regulated by the rate of addition of balls which were rolled down an incline into the container. The 100 balls were added in 12 minutes to maintain a continuous reaction. Speeding up addition rate of use of additional aluminum foil increased the reaction rate. At the rate of 100 lbs/12 minutes the continuous reactor rate is approximately 500 lbs. per hour per square foot of surface area.

This test demonstrated that a continuing reaction could be promoted by incremental additions of a subcritical premix made supercritical by the simultaneous addition of additional fuel. The rate of reaction was indicated by the temperature of reaction zone through its visible color and through the rate of release of sublimates. Based on optical pyrometer measurements the temperature was in the range of 1,300° to 1,400°C.

It is therefore to be understood that all matters contained in the above description are illustrative only with many modifications and variations being made without departing from the scope of the invention, which is to be limited only by those indicated in the appended claims.

What is claimed is:

1. A continuous process for immobilizing cesium - and ruthenium - containing radionuclide wastes as a complex metalo-silicate product which is virtually insoluble and non-leachable in alkaline or neutral environments comprising the steps of:
    a. passing a solid premix consisting of (1) a metal oxidizer selected from the group consisting of oxides, nitrates, nitrites, sulfates, sulfites, carbonates or mixtures thereof, (2) an inert material selected from crushed basalt or sand, and (3) a metal fuel selected from the group consisting of aluminum, silicon, magnesium, zirconium, titanium or alloys thereof, said metal fuel having a concentration based on weight of reaction material which is subcritical to continuous ignition reaction, and said radionuclide wastes as a nitrate salt or a calcined oxide into a reactor;
    b. adding additional metal fuel to said reactor whereby a complex metalo-silicate melt is formed by an exothermic reaction;
    c. contacting condensate off gases from said reaction with a mixture selected from the group consisting of sodium aluminate and sodium silicate or sodium hydroxide and clays at a temperature of 90°C and atmospheric pressure to immobilize cesium sublimates as cesium aluminosilicates;
    d. recycling said cesium aluminosilicate to said reactor as part of said premix;
    e. removing ruthenium fission products as reduced ruthenium metal from said complex metalo-silicate melt; and
    f. charging said complex metalo-silicate melt into a container for storage.

2. The process of claim 1 wherein said premix comprises 30 wt percent salt cake waste, 12–15 wt percent Si granules, 30 wt percent iron oxide ($Fe_2O_3$) and 25–28 wt percent crushed basalt.

3. The process of claim 2 wherein said Si granules is provided in a concentration of 12 wt percent.

4. The process of claim 1 wherein said additional metal fuel added to said reactor is aluminum and said exothermic reaction is conducted at 1,300°C.

5. The process of claim 1 wherein said radionuclide wastes are selected from the group consisting of $^{90}Sr$, $^{95}Zr$, $^{95}Nb$, $^{99}Tc$, $^{137}Cs$, $^{144}Ce$, $^{147}Pm$, $^{238}Pu$, $^{239}Pu$, $^{241}Am$ and mixtures thereof.

* * * * *